(12) United States Patent
Chen (10) Patent No.: US 10,774,681 B1
(45) Date of Patent: Sep. 15, 2020

(54) PRESSURE RELIEF DOOR ROTATING EXHAUST DEFLECTOR

(71) Applicant: Rohr, Inc., Chula Vista, CA (US)

(72) Inventor: Jason K. Chen, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 16/299,283

(22) Filed: Mar. 12, 2019

(51) Int. Cl.
*F01D 21/14* (2006.01)
*B64D 29/08* (2006.01)

(52) U.S. Cl.
CPC ............ *F01D 21/14* (2013.01); *B64D 29/08* (2013.01); *F05D 2220/321* (2013.01); *F05D 2240/14* (2013.01); *F05D 2260/605* (2013.01)

(58) Field of Classification Search
CPC ............... F01D 21/14; F05D 2220/321; F05D 2240/14; F05D 2260/605; B64D 29/08; B64D 29/00
See application file for complete search history.

(56) References Cited

U.S. PATENT DOCUMENTS

| | | |
|---|---|---|
| 4,825,644 A | 5/1989 | Bubello et al. |
| 5,704,207 A | 1/1998 | Jensen et al. |
| 8,529,196 B2 * | 9/2013 | Lore ................. B64D 29/08 415/118 |
| 2004/0000094 A1 | 1/2004 | Barbara |
| 2013/0292515 A1 | 11/2013 | Sommerer et al. |
| 2016/0047274 A1 | 2/2016 | Woolworth |
| 2016/0145918 A1 | 5/2016 | Liang |

OTHER PUBLICATIONS

EP search report for EP19212456.8 dated Jul. 15, 2020.

* cited by examiner

*Primary Examiner* — Richard A Edgar
(74) *Attorney, Agent, or Firm* — Getz Balich LLC (57) ABSTRACT

A housing includes a pressure relief door and a deflector. The pressure relief door includes a first door end disposed at a first hinge axis of the housing and an opposing second door end. The pressure relief door is rotatable between a first door position and a second door position about the first hinge axis and defines a portion of the housing in the first door position. The deflector includes a first deflector end disposed at a second hinge axis of the housing and an opposing second deflector end. The deflector is rotatable between a first deflector position and a second deflector position about the second hinge axis. Rotation of the pressure relief door from the first door position to the second door position effects rotation of the deflector from the first deflector position to the second deflector position.

20 Claims, 8 Drawing Sheets

PRESSURE RELIEF DOOR ROTATING EXHAUST DEFLECTOR

BACKGROUND

1. Technical Field

This disclosure relates generally to core structures for gas turbine engines, and more particularly to a pressure relief system for the core cowling.

2. Background Information

The engine core of a gas turbine engine includes a core cowling which forms an exterior housing of the engine core. The core cowling is spaced from the engine core leaving a core compartment therebetween. Additionally, the core cowling encloses other engine core accessories, such pressurized air (e.g., compressor bleed air) lines or ducts, which may be disposed within the core compartment. The gases contained within these lines may have high temperatures and pressures which, if exposed to composite structural materials as a result of a rupture in the lines (i.e., a "burst duct event"), may cause damage to the composite structural materials.

In order to address the above-describe concerns, pressure relief doors have been used to vent high-temperature and high-pressure gases from the core compartment during a burst duct event. However, the high-temperature gases that have been vented from the core compartment may still damage or degrade the structure of the core cowling if they are allowed to "reattach" to the core cowling after venting. To address this concern, heat shields, such as titanium heat shields, have been used to protect portions of the core cowling located downstream from the pressure relief doors. However, these heat shields add weight to the gas turbine engine and require costly materials. Additionally, integration of the heat shield with the composite core cowling may reduce the structural strength of the core cowling. Accordingly, a need exists for an improved apparatus for relieving pressure within core compartments.

SUMMARY

According to an embodiment of the present disclosure, a housing includes a pressure relief door and a deflector. The pressure relief door includes a first door end disposed at a first hinge axis of the housing and an opposing second door end. The pressure relief door is rotatable between a first door position and a second door position about the first hinge axis and defines a portion of the housing in the first door position. The deflector includes a first deflector end disposed at a second hinge axis of the housing and an opposing second deflector end. The deflector is rotatable between a first deflector position and a second deflector position about the second hinge axis. Rotation of the pressure relief door from the first door position to the second door position effects rotation of the deflector from the first deflector position to the second deflector position.

In the alternative or additionally thereto, in the foregoing embodiment, the deflector in the second deflector position prevents rotation of the pressure relief door from the second door position to the first door position.

In the alternative or additionally thereto, in the foregoing embodiment, the pressure relief door is configured to rotate from the first door position to the second door position in response to an internal pressure of the housing greater than a predetermined pressure.

In the alternative or additionally thereto, in the foregoing embodiment, the deflector is configured to remain in the second deflector position, after rotating from the first deflector position to the second deflector position, until repositioned by a user.

In the alternative or additionally thereto, in the foregoing embodiment, the housing further includes a latch in communication with the housing and the pressure relief door. The latch is configured to secure the pressure relief door in the first position while the internal pressure of the housing is less than the predetermined pressure.

In the alternative or additionally thereto, in the foregoing embodiment, the deflector includes at least one scallop disposed in the second deflector end.

In the alternative or additionally thereto, in the foregoing embodiment, the housing further includes a lanyard connecting the pressure relief door and the deflector.

In the alternative or additionally thereto, in the foregoing embodiment, the lanyard connects the second door end to the second deflector end.

According to another embodiment of the present disclosure, a gas turbine engine includes an engine core and a core cowling enclosing the engine core. The core cowling includes a pressure relief door and a deflector. The pressure relief door includes a first door end disposed at a first hinge axis of the core cowling and an opposing second door end. The pressure relief door is rotatable between a first door position and a second door position about the first hinge axis and defines a portion of the core cowling in the first door position. The deflector includes a first deflector end disposed at a second hinge axis of the core cowling and an opposing second deflector end. The deflector is rotatable between a first deflector position and a second deflector position about the second hinge axis. Rotation of the pressure relief door from the first door position to the second door position effects rotation of the deflector from the first deflector position to the second deflector position.

In the alternative or additionally thereto, in the foregoing embodiment, the deflector in the second deflector position prevents rotation of the pressure relief door from the second door position to the first door position.

In the alternative or additionally thereto, in the foregoing embodiment, the deflector in the first deflector position is configured to shield an interface between the second door end and the core cowling from a heat source within an interior of the core cowling.

In the alternative or additionally thereto, in the foregoing embodiment, the pressure relief door is configured to rotate from the first door position to the second door position in response to an interior pressure of the core cowling greater than a predetermined pressure.

In the alternative or additionally thereto, in the foregoing embodiment, the gas turbine engine further includes a latch in communication with the core cowling and the pressure relief door. The latch is configured to secure the pressure relief door in the first position while the internal pressure of the core cowling is less than the predetermined pressure.

In the alternative or additionally thereto, in the foregoing embodiment, the deflector is configured to remain in the second deflector position, after rotating from the first deflector position to the second deflector position, until repositioned by a user.

In the alternative or additionally thereto, in the foregoing embodiment, the deflector, in the second deflector position, is configured to direct heated gases from an interior of the core cowling away from the core cowling.

In the alternative or additionally thereto, in the foregoing embodiment, bypass air flows along a bypass flow path adjacent the core cowling and the deflector directs the heated gases into a radially outer portion of the bypass flow path.

In the alternative or additionally thereto, in the foregoing embodiment, the deflector includes at least one scallop disposed in the second deflector end.

In the alternative or additionally thereto, in the foregoing embodiment, the deflector is downstream of the pressure relief door with respect to the bypass air flow.

In the alternative or additionally thereto, in the foregoing embodiment, the core cowling further includes a lanyard connecting the pressure relief door and the deflector.

According to another embodiment of the present disclosure, a gas turbine engine includes a nacelle, an engine core disposed within the nacelle, and a core cowling enclosing the engine core. The nacelle and the core cowling define a bypass flow path therebetween. The core cowling includes a pressure relief door, a deflector, and a lanyard connecting the pressure relief door and the deflector. The pressure relief door includes a first door end disposed at a first hinge axis of the core cowling and an opposing second door end. The pressure relief door is rotatable between a first door position and a second door position about the first hinge axis and defines a portion of the core cowling in the first door position. The deflector includes a first deflector end disposed at a second hinge axis of the core cowling and an opposing second deflector end. The deflector is rotatable between a first deflector position and a second deflector position about the second hinge axis. Rotation of the pressure relief door from the first position to the second position effects rotation of the deflector from the first deflector position to the second deflector position. The deflector, in the second deflector position, is configured to direct heated gases from an interior of the core cowling into a radially outer portion of the bypass flow path.

The present disclosure, and all its aspects, embodiments and advantages associated therewith will become more readily apparent in view of the detailed description provided below, including the accompanying drawings.

DETAILED DESCRIPTION

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Figure 1:
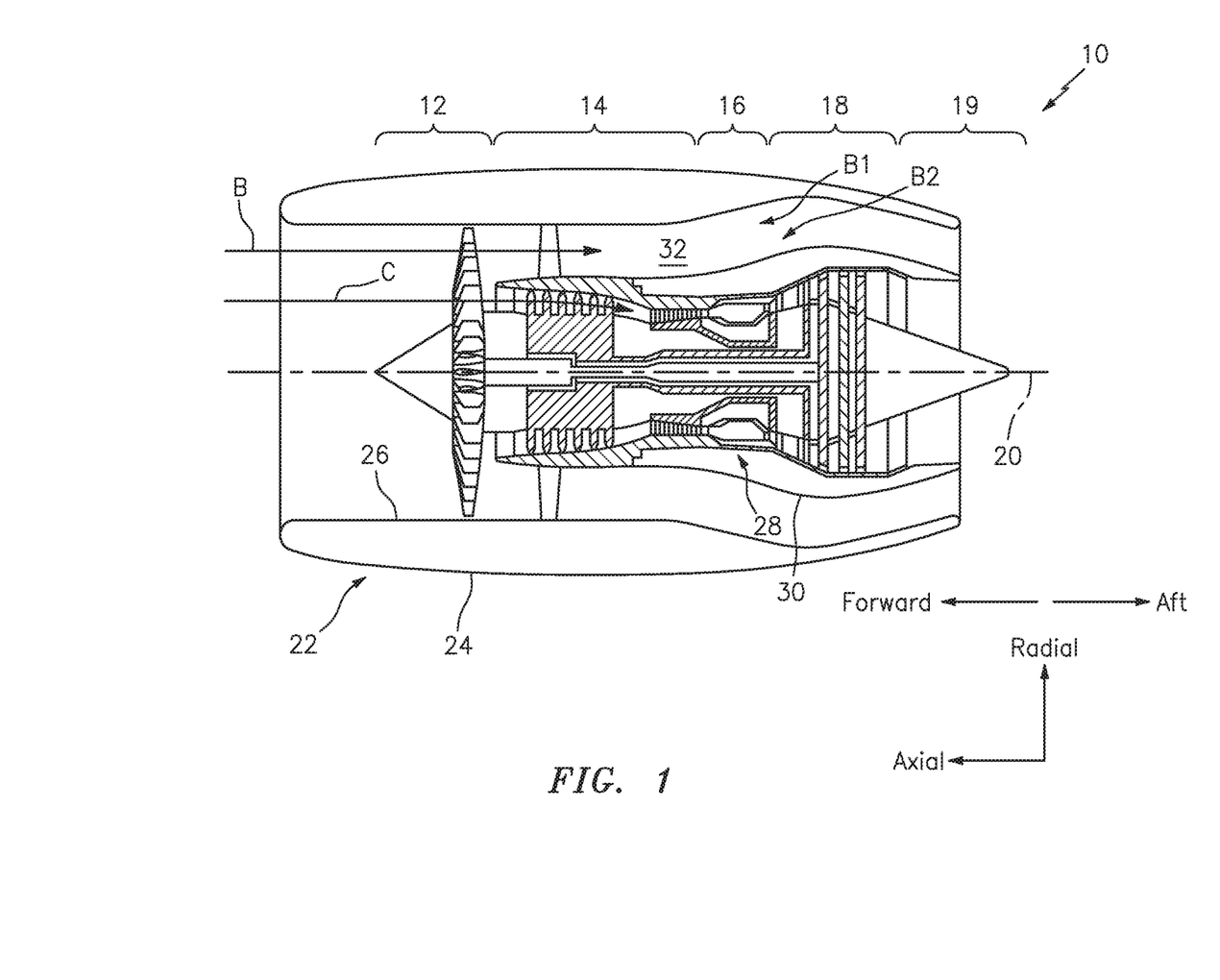
FIG. 1 illustrates a side, cross-sectional view of a gas turbine engine.

Referring to FIG. 1 a gas turbine engine 10 generally includes a fan section 12, a compressor section 14, a combustor section 16, a turbine section 18, and an exhaust section 19 disposed about an axial centerline 20. The gas turbine engine 10 further includes a nacelle 22 defining an exterior housing of the gas turbine engine 10 about the axial centerline 20. The nacelle 22 includes an outer barrel 24 defining a radially outermost surface of the nacelle 22 and an inner barrel 26 defining a radially innermost surface of the nacelle 22.

An engine core 28 generally includes all or part of the fan section 12, compressor section 14, combustor section 16, turbine section 18, and exhaust section 19. A core cowling 30 (i.e., a core nacelle or core shroud) defines an exterior housing of the engine core 28 about the axial centerline 20. In some embodiments, all or part of the core cowling 30 may be made of, for example, composite materials or any other suitable material. While the present disclosure is discussed with respect to aircraft gas turbine engines, it should be understood that the present disclosure is not limited to use in gas turbine engines or aircraft and may be applied to any other suitable vehicle, industrial application, or environment where compartment pressure relief is desirable.

The inner barrel 26 and the core cowling 30 may generally define an annular bypass duct 32 therebetween. The fan section 12 drives air along a bypass flow path B through the gas turbine engine 10. At least a portion of the bypass flow path B may pass through the bypass duct 32. As will be discussed in further detail, the bypass flow path B through the bypass duct 32 may be referred to in terms of a radially outer bypass flow path B1 and a radially inner bypass flow path B2. The compressor section 14 drives air along a core flow path C, separate from the bypass flow path B, for compression and communication into the combustor section 16 and then expansion through the turbine section 18.

Figure 2:
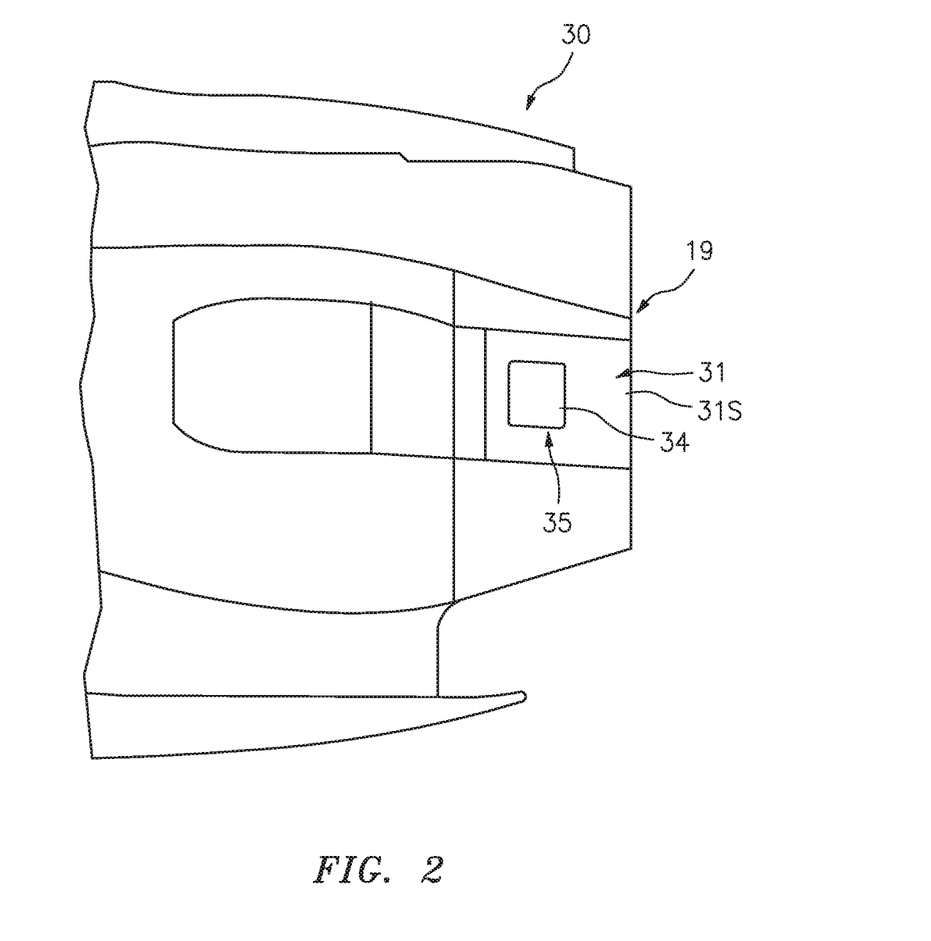
FIG. 2 illustrates an exterior side view of an engine core cowling.
Figure 3:
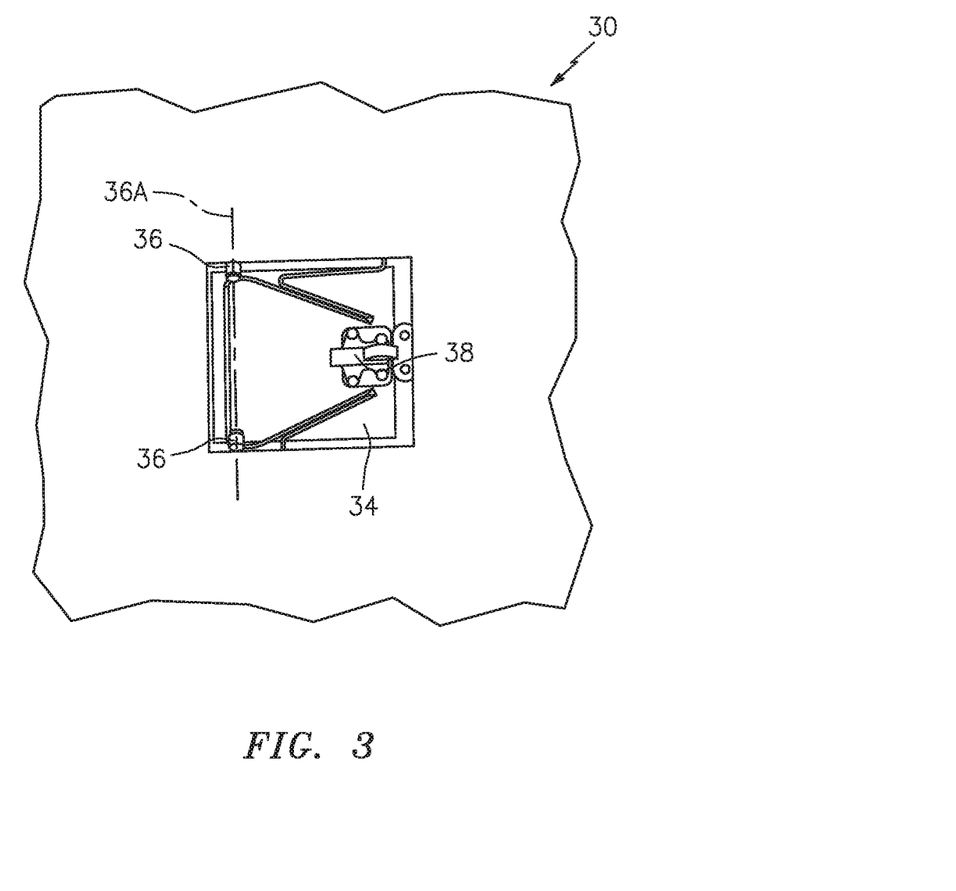
FIG. 3 illustrates an interior side view of an engine core cowling.
Figure 5:
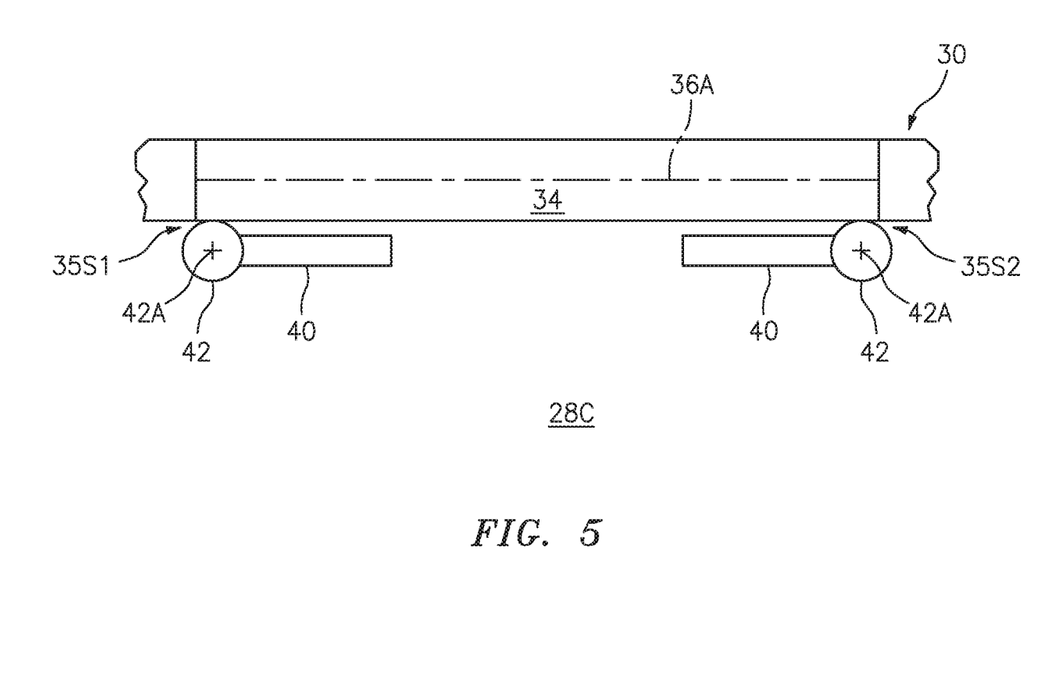
FIG. 5 illustrates an aft view of a pressure relief door in a shut position.

Referring to FIGS. 2, 3, and 5, the core cowling 30 may include one or more pressure relief doors 34 configured to release high-pressure and high-temperature gases from a compartment of the engine core 28, for example, during a burst duct event. For example, a plurality of pressure relief doors 34 may be circumferentially spaced about the core cowling 30.

The pressure relief door 34 may be rotatably mounted to the core cowling 30 by, for example, one or more hinges 36. For example, the hinges 36 may be configured to permit rotation of the pressure relief door 34 about a hinge axis 36A. In some embodiments, the hinge axis 36A may be substantially perpendicular to the bypass flow path B. The core cowling 30 includes a pressure relief opening 35 corresponding to the pressure relief door 34. The opening 35 has a first end 35E1 and an opposing second end 35E2. The opening 35 additionally has a first side 35S1 and a second side 35S2, each side 35S1, 35S2 extending between the first end 35E1 and the second end 35E2. As used herein, the term "substantially" with regard to an angular relationship refers to the noted angular relationship+/−10 degrees.

In some embodiments, the pressure relief door 34 may be disposed on an aft portion of the core cowling 30 proximate the exhaust section 19 to ensure that high-temperature gases exiting the pressure relief door 34 do not damage the nacelle 22 and core cowling 30. For example, the pressure relief door 34 may be disposed proximate the aft end of the nacelle 22. The core cowling 30 includes a downstream portion 31 disposed downstream of the pressure relief door 34. In some embodiments, the downstream portion 31 may include a heat shield 31S configured to protect the structure of the downstream portion 31 from high-temperature gases exiting through the pressure relief door opening 35. The heat shield 31S may be, for example, titanium or any other suitable high-temperature resistant material. In some embodiments, the heat shield 31S may be an integral to the downstream portion 31 of the core cowling 30. In some other embodiments, inclusion of a heat shield 31S to protect the structure of the downstream portion 31 may not be necessary.

Figure 4A:
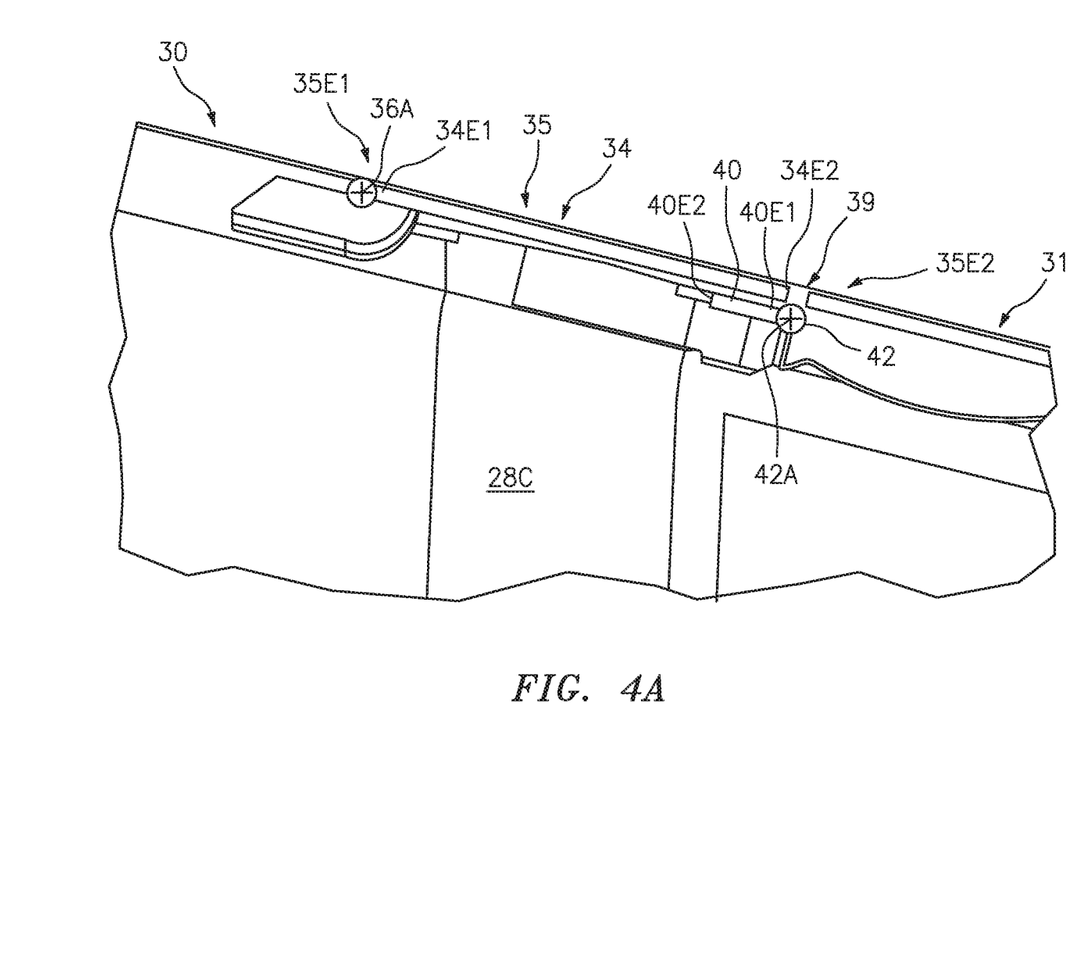
FIG. 4A illustrates a pressure relief door in a shut position.

As will be discussed in further detail, the pressure relief door 34 is rotatable between an open position (see FIG. 4B) and a closed position (as shown in FIGS. 2, 3, and 4A). As used herein, the "closed position" will be used to refer to the pressure relief door 34 in a position so as to form a substantially continuous exterior surface with the core cowling 30 (i.e., the pressure relief door 30 is in a standard position for operation of the gas turbine engine 10). As used herein, the "open position" will be used to refer to the pressure relief door 34 in a position other than the closed position (i.e., the pressure relief door 34 is partially open, fully open, etc.).

The pressure relief door 34 may include one or more latches 38 configured to secure the pressure relief door 34 in the shut position during normal operation of the gas turbine engine 10. The latch 38 may be configured to release the pressure relief door 34 upon the occurrence of a predetermined condition, for example, a high pressure in the interior of the core cowling 30. Actuation of the latch 38 to release the pressure relief door 34 may be accomplished by any suitable means including, for example, a pressure sensing spring, or a hydraulically, pneumatically, or electrically actuated release mechanism in communication with an associated sensor (e.g., a pressure sensor). In some embodiments, the interior pressure of the core cowling 30 may be sufficient to rotate the pressure relief door 34 from the closed position to the open position once the latch is released. In some other embodiments, the pressure relief door 34 may include an apparatus configured to effect rotation of the pressure relief door 34 from the closed position to the open position.

Figure 4B:
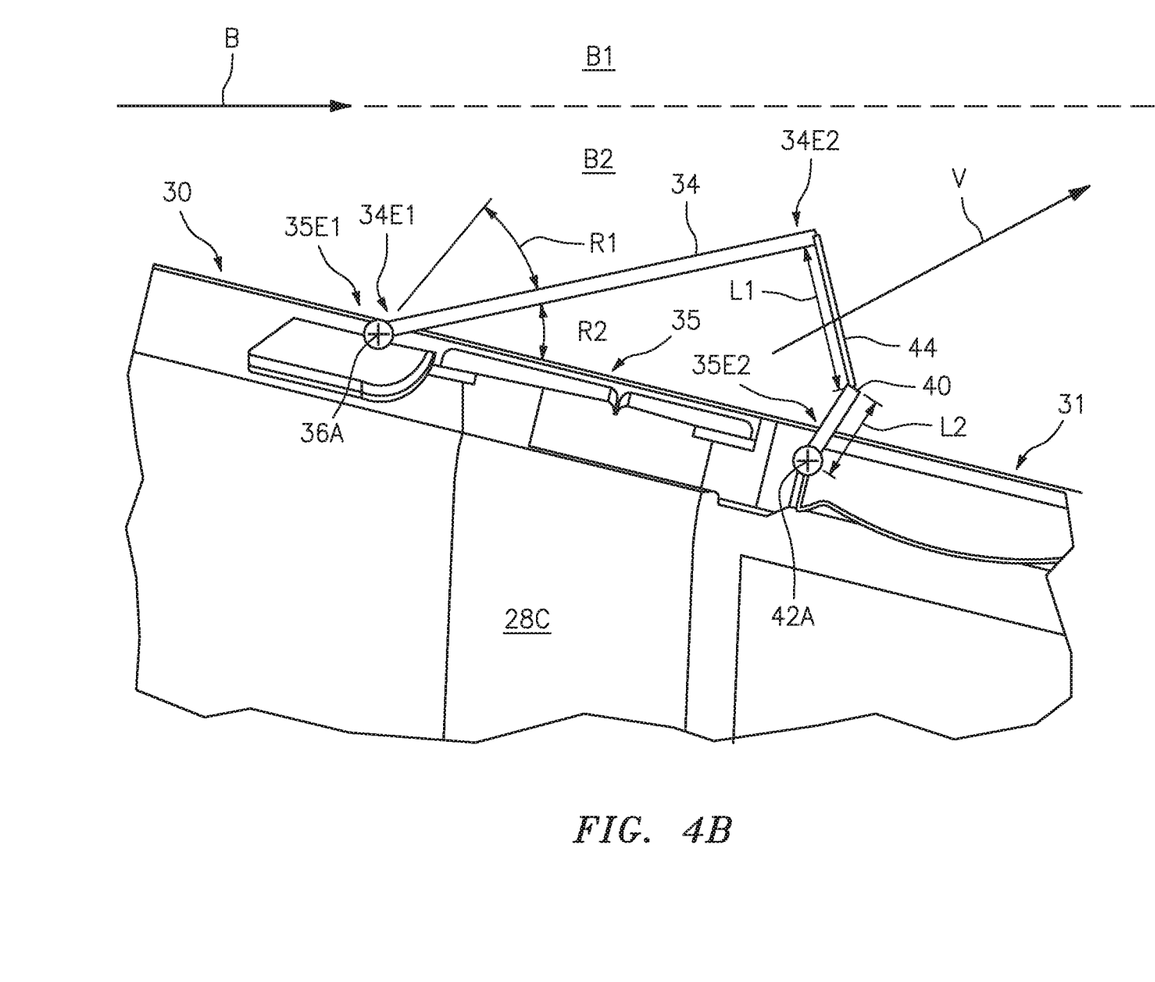
FIG. 4B illustrates the pressure relief door of FIG. 4A in an open position.

Referring to FIGS. 4A, 4B, and 5, the pressure relief door 34 is shown in a closed position (FIG. 4A) and an open position (FIG. 4B), respectively. The pressure relief door 34 includes a first end 34E1 and an opposing second end 34E2. The first end 34E1 may be rotatably coupled to the core cowling 30 of the engine core 28 by the hinges 36 about the hinge axis 36A. The second end 34E2 is disposed proximate the core cowling 30 thereby defining an interface 39 between the pressure relief door 34 and the core cowling 30. In some embodiments, the second end 34E2 of the door may be substantially flush with the core cowling 30 at the interface 39. In the closed position, the pressure relief door 34 may form a portion of the core cowling 30 (i.e., the exterior surface of the pressure relief door may form a substantially continuous exterior surface of the core cowling 30.

The core cowling 30 may include one or more deflectors 40 configured to direct high-temperature gases from a core compartment 28C of the engine core 28 away from the downstream portion 31 of the core cowling 30, for example, during a burst duct event. The deflector 40 may be positioned relative to a respective pressure relief door 34 so as to operate together to relieve an interior pressure of the core compartment 28C. The deflector 40 includes a first end 40E1 and an opposing second end 40E2. The deflector 40 may be rotatably mounted to the core cowling 30 at the first end 40E1 by, for example, one or more hinges 42. For example, the hinges 42 may be configured to permit rotation of the deflector about a hinge axis 42A. In some embodiments, the hinge axis 42A may be substantially perpendicular to the bypass flow path B and/or substantially parallel to the hinge axis 36A. As shown in FIGS. 4A and 4B, in some embodiments, the pressure relief door 34 may be rotatably mounted to the core cowling 30 proximate the first end 35E1 of the opening 35 while the deflector 40 is rotatably mounted to the core cowling 30 proximate the second end 35E2 of the opening 35. For example, FIG. 4A shows the deflector 40 in a closed position while FIG. 4B shows the deflector 40 in an open position. In some embodiments, the deflector 40 may be disposed downstream (i.e., with respect to the bypass flow path B) and/or aft of the pressure relief door 34.

As shown in FIG. 4B, in some embodiments, the pressure relief door 34 and corresponding deflector 40 may include a lanyard 44 connecting the pressure relief door 34 to the deflector 40. Rotation of the pressure relief door from the closed position to the open position may effect a corresponding rotation of the deflector 40 from the closed position to the open position. Rotation of the pressure relief door 34, as a result of gases venting from the core compartment 38C, may cause the pressure relief door 34 to pull the deflector 40 from the closed position to the open position via the lanyard 44. In some embodiments, the lanyard 44 may connect the second end 34E2 of the pressure relief door 34 to the second end 40E2 of the deflector 40. In some other embodiments, rotation of the deflector 40 from the closed position to the open position, in response to rotation of the pressure relief door 34 from the closed position to the open position, may not require a lanyard 44 connecting the pressure relief door 34 to the deflector 40. For example, rotation of the deflector 40 from the closed position to the open position may be effected by a spring or other biasing device or, alternatively, by the force of gases venting from the compartment 28C (e.g., gases venting substantially along a vent flow path V). Thus, rotation of the pressure relief door 34 from the closed position to the open position may release the deflector 40 to rotate from the closed position to the open position.

FIG. 5 illustrates a side view of an exemplary pressure relief door 34 from an aft perspective. The pressure relief door 34 of FIG. 5 has an orientation with respect to the core cowling 30 which is substantially similar to the orientation of the pressure relief door 34 as shown in FIGS. 4A and 4B. As shown in FIG. 5, in some embodiments, more than one deflector 40 may be rotatably mounted to the core cowling 30, for example, proximate and aligned with the first side 35S1 of the opening 35 and the second side 35S2 of the opening 35. Accordingly, in embodiments including a lanyard 44 connecting the pressure relief door 34 to the deflector 40, each deflector of the more than one deflector 40 may include a lanyard 44 connecting the respective deflector 40 to the pressure relief door 34. Rotation of the pressure relief door 34, about the hinge axis 36A, from the closed position to the open position, may thereby effect rotation of the more than one deflector 40 from the closed position to the open position about the hinge axis 42A.

As previously discussed, the core cowling 30 encloses one or more ducts or lines containing high-temperature and/or high-pressure gas. An equipment failure leading to a rupture from one of the ducts into the core compartment 28C (i.e., a burst duct event) may rapidly fill the core compartment 28C with the high-temperature and/or high-pressure gas. In response to the burst duct event, the latch 38 may release the pressure relief door 34 from the closed position, thereby allowing the pressure relief door 34 to rotate to the open position. Rotation of the pressure relief door 34 to the open position may further effect rotation of the deflector 40 from the closed position to the open position via the lanyard 44.

Referring to FIG. 4B, in the open position, the deflector 40 directs high-temperature gas from the core compartment 28C into the bypass flow path B thereby forcing the high-temperature gas to mix with the relatively cooler bypass air. For example, high-temperature gas may be vented from the core compartment 28C substantially along the vent flow path V. As a result, high-temperature gas may be prevented from reattaching to and possibly damaging the downstream portion 31. In other words, high-temperature fluids are directed sufficiently far into the bypass flowpath B (e.g., radially away from the core cowling 30) such that the gas do not deleteriously interact with (i.e., reattach to) the downstream portion 31. For example, high-temperature gas may be directed towards the outer bypass flow path B1 wherein reattachment of high-temperature gas with the downstream portion 31 is reduced or eliminated. In other words, heat gases directed towards the outer bypass flow path B1 may not deleteriously affect the downstream portion 31. In some embodiments, a maximum amount that the pressure relief door 34 may rotate in direction R1 may depend on a length L1 of the lanyard 44 and/or a length L2 of the deflector 40.

Figure 4C:
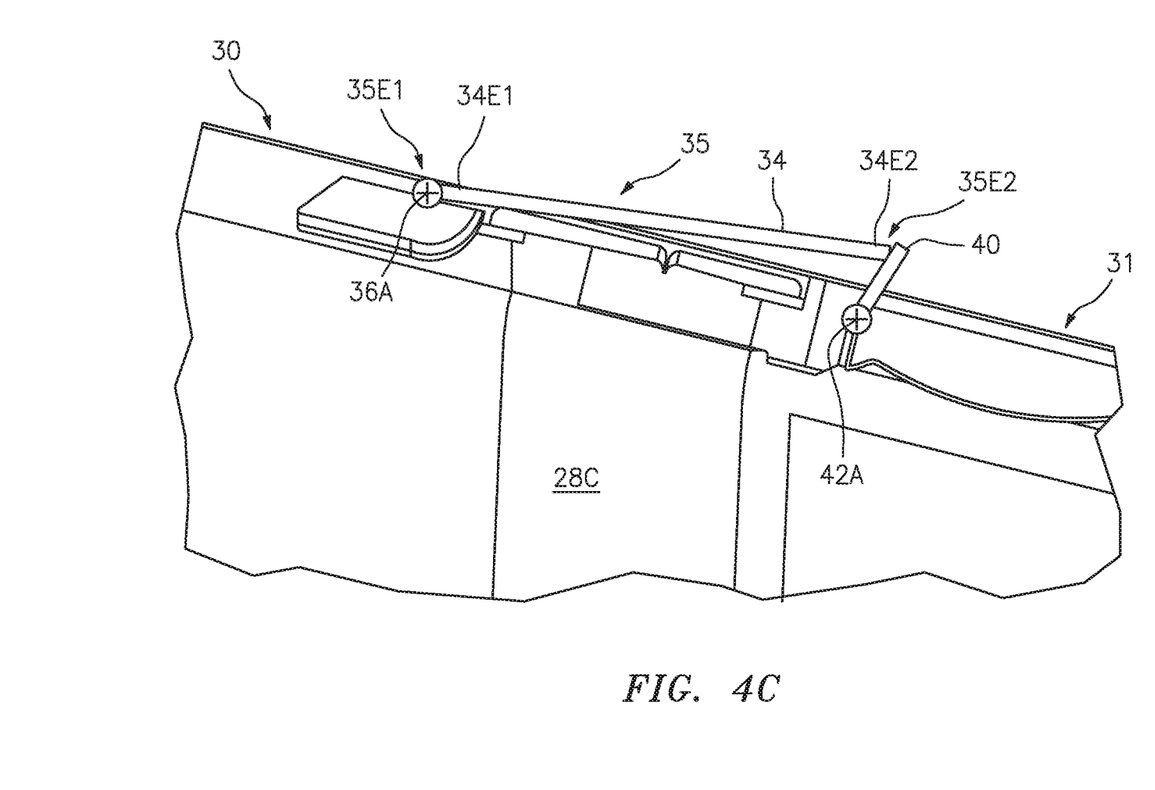
FIG. 4C illustrates the pressure relief door of FIG. 4A in an open position.

Referring to FIGS. 4B and 4C, during a burst duct event, the pressure relief door 34 may reach an equilibrium position wherein the force of the bypass flow path B on the exterior of the pressure relief door 34 equals the force of the vent flow path V venting from the core compartment 38C. Subsequent to the rotation of the pressure relief door 34 to the open position, pressure within the core compartment 38C may be reduced or returned substantially to a typical operating pressure of the core compartment 38C, thereby causing the pressure relief door 34 to rotate in direction R2 towards the core cowling 30.

As shown in FIG. 4C, in some embodiments, the deflector 40 is configured to remain in the open position after rotating from the shut position to the open position, for example, in response to a burst duct event. The deflector 40 in the open position may prevent the pressure relief door 34 from returning to the closed position. In said embodiments, the presence of the pressure relief door 34 and the deflector 40 in the respective open positions may provide a visual indication to ground crew personnel or other equipment technicians that a burst duct event or other equipment malfunction has occurred. Thus, the deflector 40 may remain in the open position until repositioned by a user (e.g., ground crew personnel).

Figure 6A:
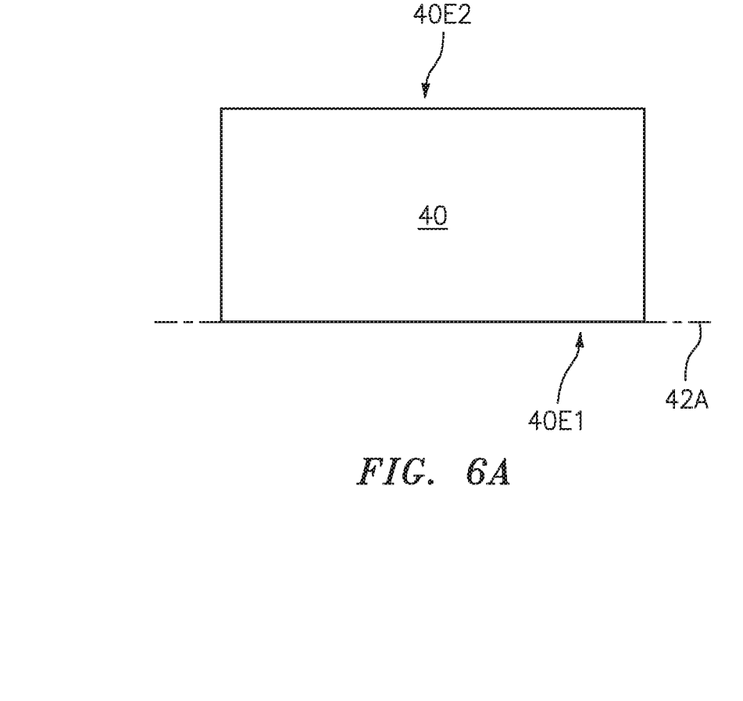
FIG. 6A illustrates a front view of an exemplary deflector.
Figure 6B:
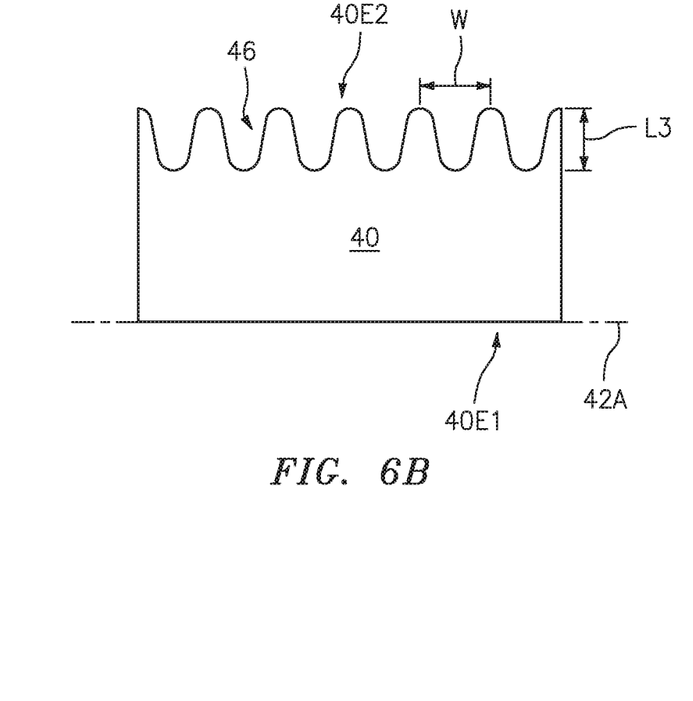
FIG. 6B illustrates a front view of another exemplary deflector.

Referring to FIGS. 6A and 6B, the deflector 40 may have a substantially rectangular cross-sectional shape (see FIG. 6A). In other embodiments, the deflector 40 may include one or more scallops 46 disposed in the second end 40E2 of the deflector to provide better mixing of high-temperature fluids from the core compartment 38C with the air in the bypass flow path B. The scallops 46 may have any suitable length L3 and/or width W to effect mixing of the high-temperature fluids. In some embodiments, one or more scallops 46 may have a different length L3 and/or width W than one or more other scallops 46.

In some embodiments, operation of the pressure relief door 34 and the deflector 40 to prevent reattachment of high-temperature fluids to the downstream portion 31 may reduce or eliminate the need for the heat shield 31S in the downstream portion 31. Elimination of the heat shield 31S may provide for an overall reduction in the weight of the core cowling 30 and, thus, the weight of the gas turbine engine 10. Further, elimination of the heat shield 31S may result in greater structural strength of the core cowling 30 by allowing a more continuous composite structure which could otherwise be damaged by vented high-temperature fluids. The increased continuous composite structure may provide additional surface area for acoustic attenuating structures, such as honeycomb structures, on the core cowling 30, thereby providing increased sound attenuation proximate the downstream portion 31.

Referring again to FIG. 4A, in some embodiments, the deflector 40 in the closed position may be configured to shield the interface 39 between the pressure relief door 34 and the core cowling 30 from a heat source (e.g., a heat source of the engine core 28 as a result of general gas turbine engine 10 operation or a mechanical failure such as a burst duct) within the core compartment 28C. For example, the deflector 40 may be disposed between the interface 39 and the heat source in order to prevent excessive temperatures in composite portions of the interface 39. In some embodiments, the deflector 40 may be made of a high-temperature resistant material such as titanium or any other suitable material for shielding the interface 39.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A housing comprising:
    a pressure relief door comprising a first door end disposed at a first hinge axis of the housing and an opposing second door end, the pressure relief door rotatable between a first door position and a second door position about the first hinge axis and defining a portion of the housing in the first door position; and
    a deflector comprising a first deflector end disposed at a second hinge axis of the housing and an opposing second deflector end, the deflector rotatable between a first deflector position and a second deflector position about the second hinge axis,
    wherein rotation of the pressure relief door from the first door position to the second door position effects rotation of the deflector from the first deflector position to the second deflector position.

2. The housing of claim 1, wherein the deflector in the second deflector position prevents rotation of the pressure relief door from the second door position to the first door position.

3. The housing of claim 1, wherein the pressure relief door is configured to rotate from the first door position to the second door position in response to an internal pressure of the housing greater than a predetermined pressure.

4. The housing of claim 1, wherein the deflector is configured to remain in the second deflector position, after rotating from the first deflector position to the second deflector position, until repositioned by a user.

5. The housing of claim 3, further comprising a latch in communication with the housing and the pressure relief door, the latch configured to secure the pressure relief door in the first position while the internal pressure of the housing is less than the predetermined pressure.

6. The housing of claim 1, wherein the deflector comprises at least one scallop disposed in the second deflector end.

7. The housing of claim 1, further comprising a lanyard connecting the pressure relief door and the deflector.

8. The housing of claim 7, wherein the lanyard connects the second door end to the second deflector end.

9. A gas turbine engine comprising:
an engine core; and
a core cowling enclosing the engine core, the core cowling comprising:
a pressure relief door comprising a first door end disposed at a first hinge axis of the core cowling and an opposing second door end, the pressure relief door rotatable between a first door position and a second door position about the first hinge axis and defining a portion of the core cowling in the first door position; and
a deflector comprising a first deflector end disposed at a second hinge axis of the core cowling and an opposing second deflector end, the deflector rotatable between a first deflector position and a second deflector position about the second hinge axis,
wherein rotation of the pressure relief door from the first door position to the second door position effects rotation of the deflector from the first deflector position to the second deflector position.

10. The gas turbine engine of claim 9, wherein the deflector in the second deflector position prevents rotation of the pressure relief door from the second door position to the first door position.

11. The gas turbine engine of claim 9, wherein the deflector in the first deflector position is configured to shield an interface between the second door end and the core cowling from a heat source within an interior of the core cowling.

12. The gas turbine engine of claim 9, wherein the pressure relief door is configured to rotate from the first door position to the second door position in response to an interior pressure of the core cowling greater than a predetermined pressure.

13. The gas turbine engine of claim 12, further comprising a latch in communication with the core cowling and the pressure relief door, the latch configured to secure the pressure relief door in the first position while the internal pressure of the core cowling is less than the predetermined pressure.

14. The gas turbine engine of claim 9, wherein the deflector is configured to remain in the second deflector position, after rotating from the first deflector position to the second deflector position, until repositioned by a user.

15. The gas turbine engine of claim 9, wherein the deflector, in the second deflector position, is configured to direct heated gases from an interior of the core cowling away from the core cowling.

16. The gas turbine engine of claim 15, wherein bypass air flows along a bypass flow path adjacent the core cowling and the deflector directs the heated gases into a radially outer portion of the bypass flow path.

17. The gas turbine engine of claim 9, wherein the deflector comprises at least one scallop disposed in the second deflector end.

18. The gas turbine engine of claim 16, wherein the deflector is downstream of the pressure relief door with respect to the bypass air flow.

19. The gas turbine engine of claim 9, wherein the core cowling further comprises a lanyard connecting the pressure relief door and the deflector.

20. A gas turbine engine comprising:
a nacelle;
an engine core disposed within the nacelle; and
a core cowling enclosing the engine core, the nacelle and the core cowling defining a bypass flow path therebetween, the core cowling comprising:
a pressure relief door comprising a first door end disposed at a first hinge axis of the core cowling and an opposing second door end, the pressure relief door rotatable between a first door position and a second door position about the first hinge axis and defining a portion of the core cowling in the first door position;
a deflector comprising a first deflector end disposed at a second hinge axis of the core cowling and an opposing second deflector end, the deflector rotatable between a first deflector position and a second deflector position about the second hinge axis; and
a lanyard connecting the pressure relief door and the deflector,
wherein rotation of the pressure relief door from the first door position to the second door position effects rotation of the deflector from the first deflector position to the second deflector position, and
wherein the deflector, in the second deflector position, is configured to direct heated gases from an interior of the core cowling into a radially outer portion of the bypass flow path.

* * * * *